US009679587B2

(12) United States Patent
Taguchi et al.

(10) Patent No.: US 9,679,587 B2
(45) Date of Patent: Jun. 13, 2017

(54) HIGH FREQUENCY ASSISTED MAGNETIC RECORDING HEAD AND DISK DEVICE COMPRISING THE MAGNETIC RECORDING HEAD

(71) Applicant: Kabushiki Kaisha Toshiba, Minato-ku, Tokyo (JP)

(72) Inventors: Tomoko Taguchi, Tokyo (JP); Katsuhiko Koui, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/945,269

(22) Filed: Nov. 18, 2015

(65) Prior Publication Data

US 2017/0061995 A1 Mar. 2, 2017

(30) Foreign Application Priority Data

Aug. 25, 2015 (JP) ................. 2015-165492

(51) Int. Cl.
*G11B 5/31* (2006.01)
*G11B 5/235* (2006.01)
*G11B 5/127* (2006.01)
*G11B 5/00* (2006.01)

(52) U.S. Cl.
CPC ............ *G11B 5/1278* (2013.01); *G11B 5/235* (2013.01); *G11B 5/314* (2013.01); *G11B 5/3153* (2013.01); *G11B 5/3176* (2013.01); *G11B 2005/0024* (2013.01)

(58) Field of Classification Search
None
See application file for complete search history.

(56) References Cited

U.S. PATENT DOCUMENTS

| 8,705,206 B1* | 4/2014 | Maeda et al. | ............ G11B 5/23 360/119.04 |
| 2010/0007996 A1* | 1/2010 | Iwasaki et al. | ...... G11B 5/3906 360/324 |
| 2011/0043943 A1 | 2/2011 | Igarashi et al. | |
| 2011/0205655 A1 | 8/2011 | Shimizu et al. | |
| 2012/0262820 A1 | 10/2012 | Matsumoto et al. | |
| 2013/0250456 A1 | 9/2013 | Yamada et al. | |
| 2013/0279046 A1* | 10/2013 | Iwasaki et al. | ........... G11B 5/11 360/319 |

(Continued)

FOREIGN PATENT DOCUMENTS

JP 2012-066240 A 4/2012

*Primary Examiner* — Craig A. Renner
(74) *Attorney, Agent, or Firm* — White & Case LLP

(57) ABSTRACT

According to one embodiment, a magnetic recording head includes an air-bearing surface, a main magnetic pole, a write shield opposed to the main magnetic pole with a write gap therebetween, a high-frequency oscillator which includes a spin injection layer and a oscillation layer and is provided between the main magnetic pole and the write shield, the oscillation layer and the spin injection layer including a stack surface extending in a direction intersecting with the air-bearing surface, and a magnetic material layer which is provided in at least one of the main magnetic pole and the write shield, faces the high-frequency oscillator, and has negative magnetic anisotropy with respect to a direction intersecting with the stack surfaces of the high-frequency oscillator.

18 Claims, 20 Drawing Sheets

(56) References Cited

U.S. PATENT DOCUMENTS

2013/0329316 A1\* 12/2013 Watanabe et al. ... G11B 5/3146
  360/125.01
2016/0314809 A1\* 10/2016 Taguchi et al. ........ G11B 5/314

\* cited by examiner

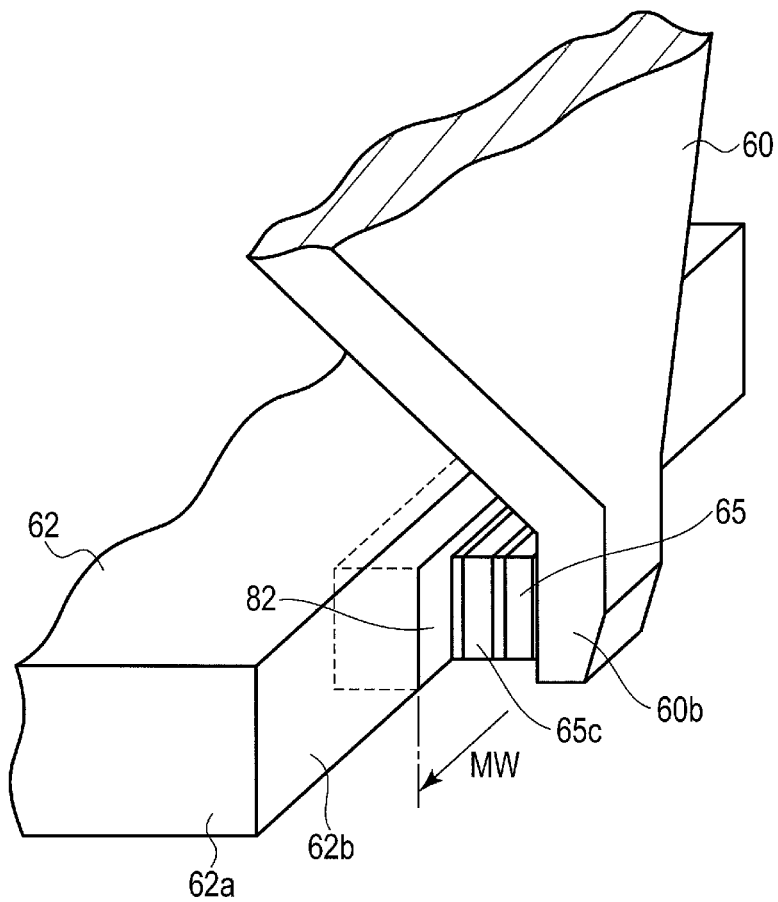
F I G. 7

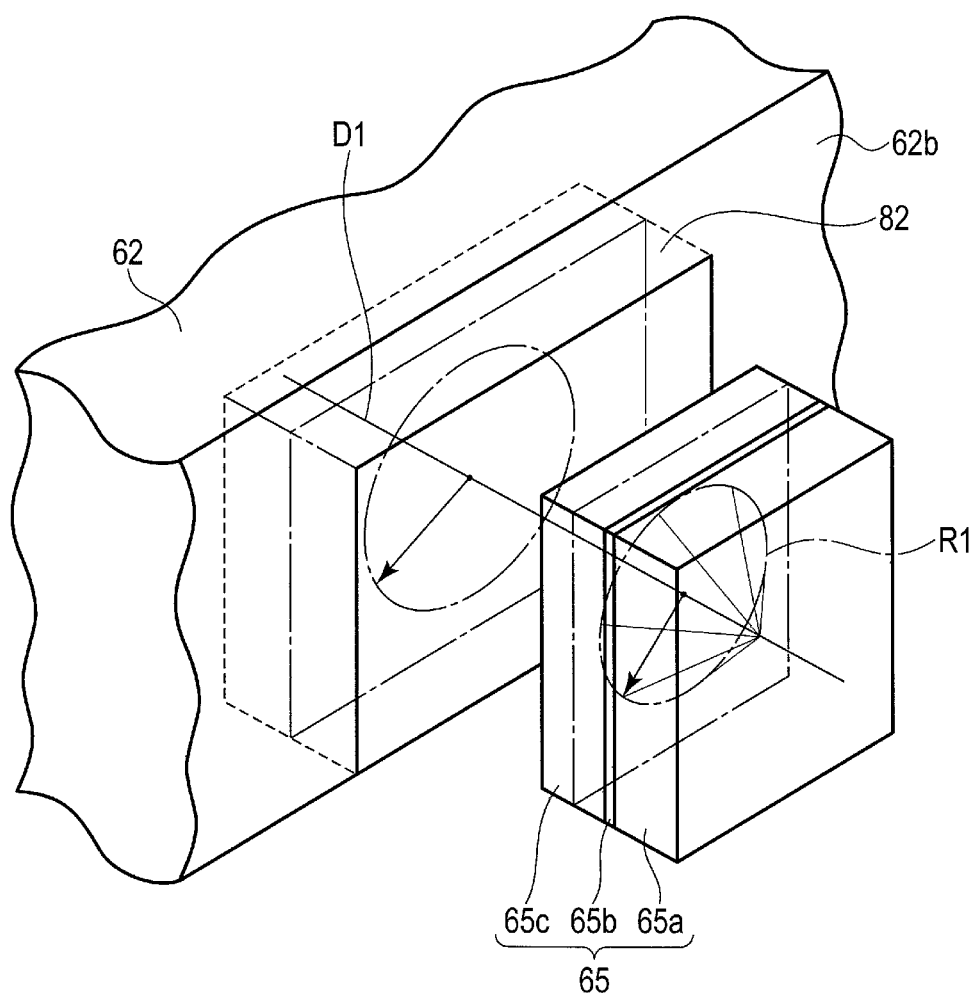
F I G. 8

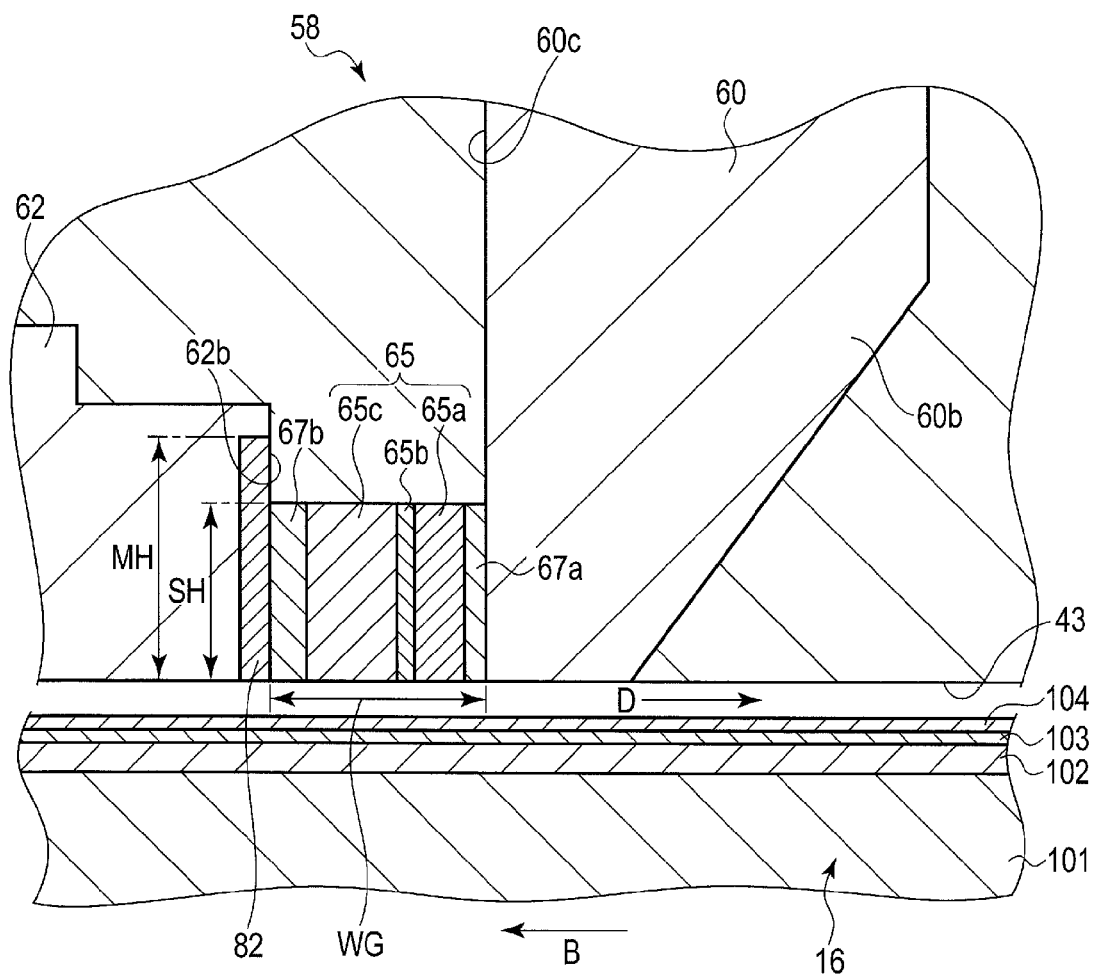
F I G. 10

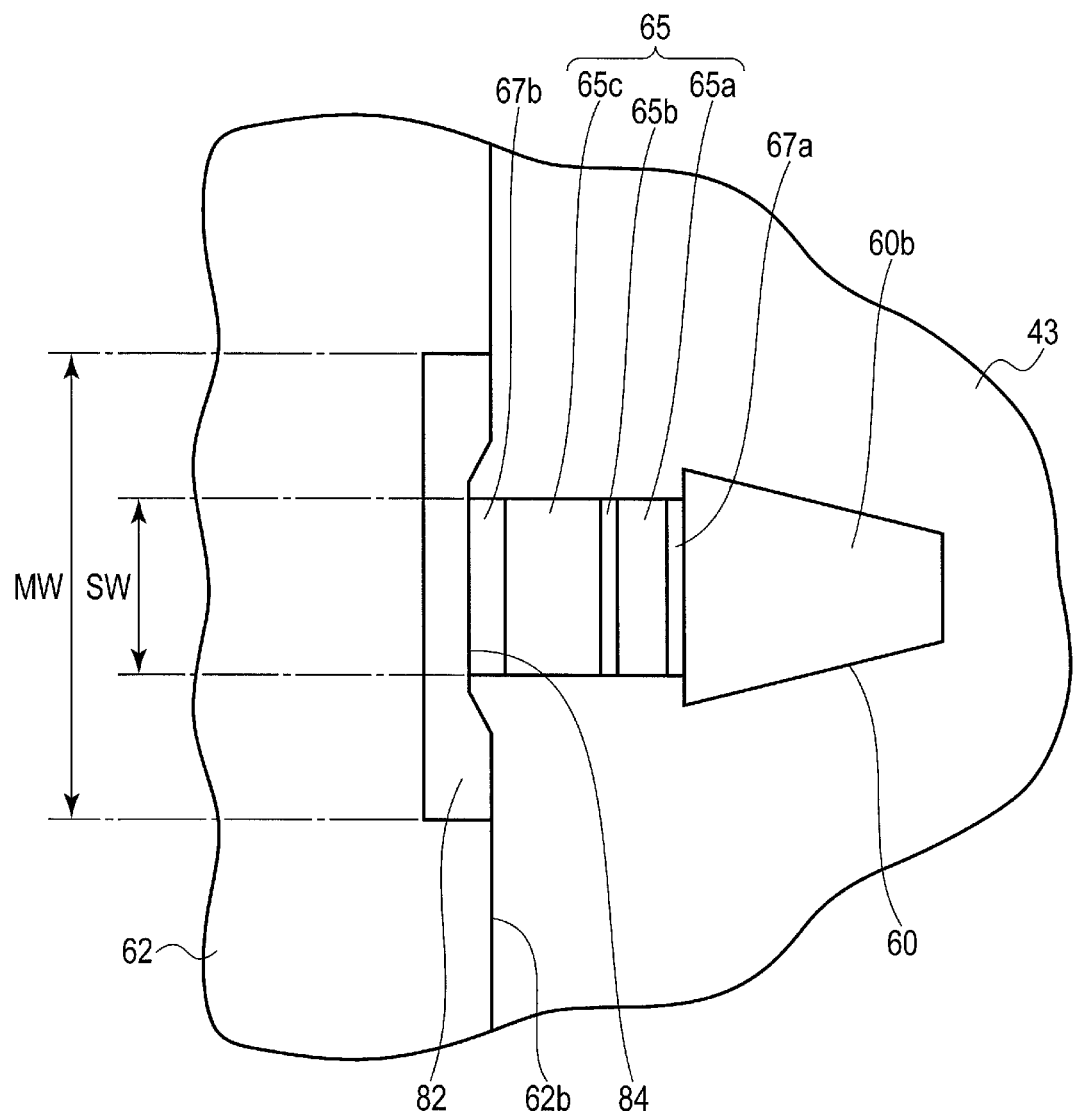
F I G. 11

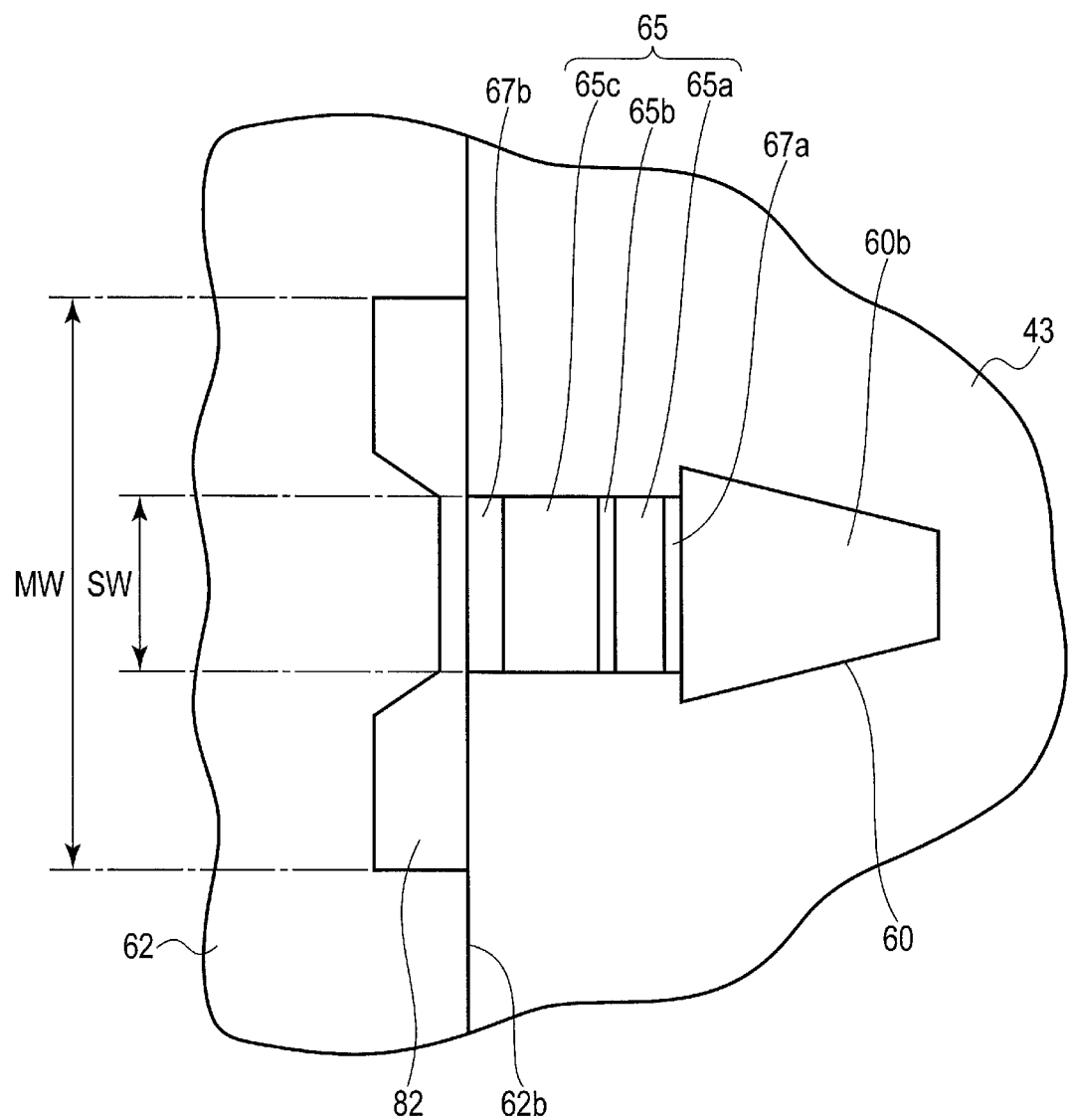
F I G. 13

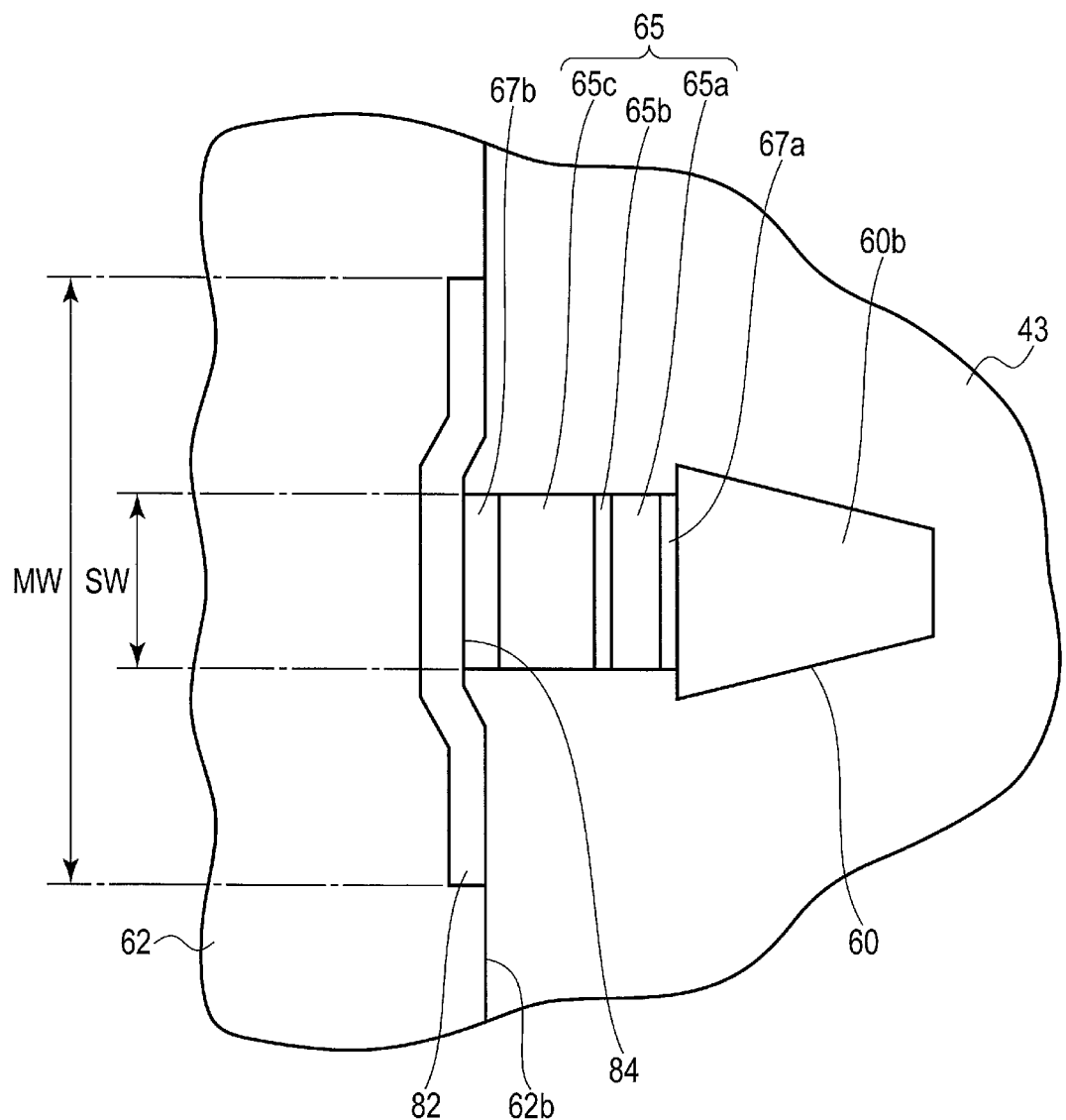
F I G. 15

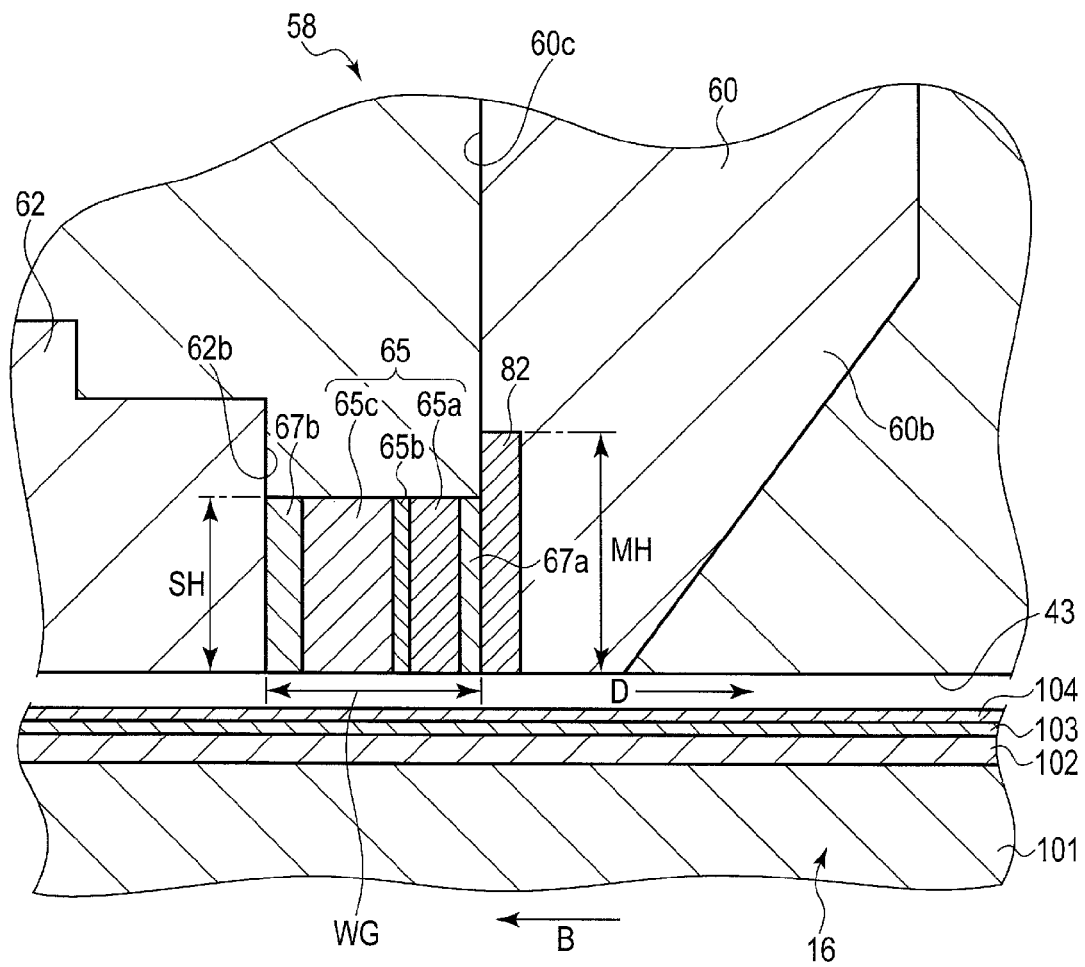
F I G. 16

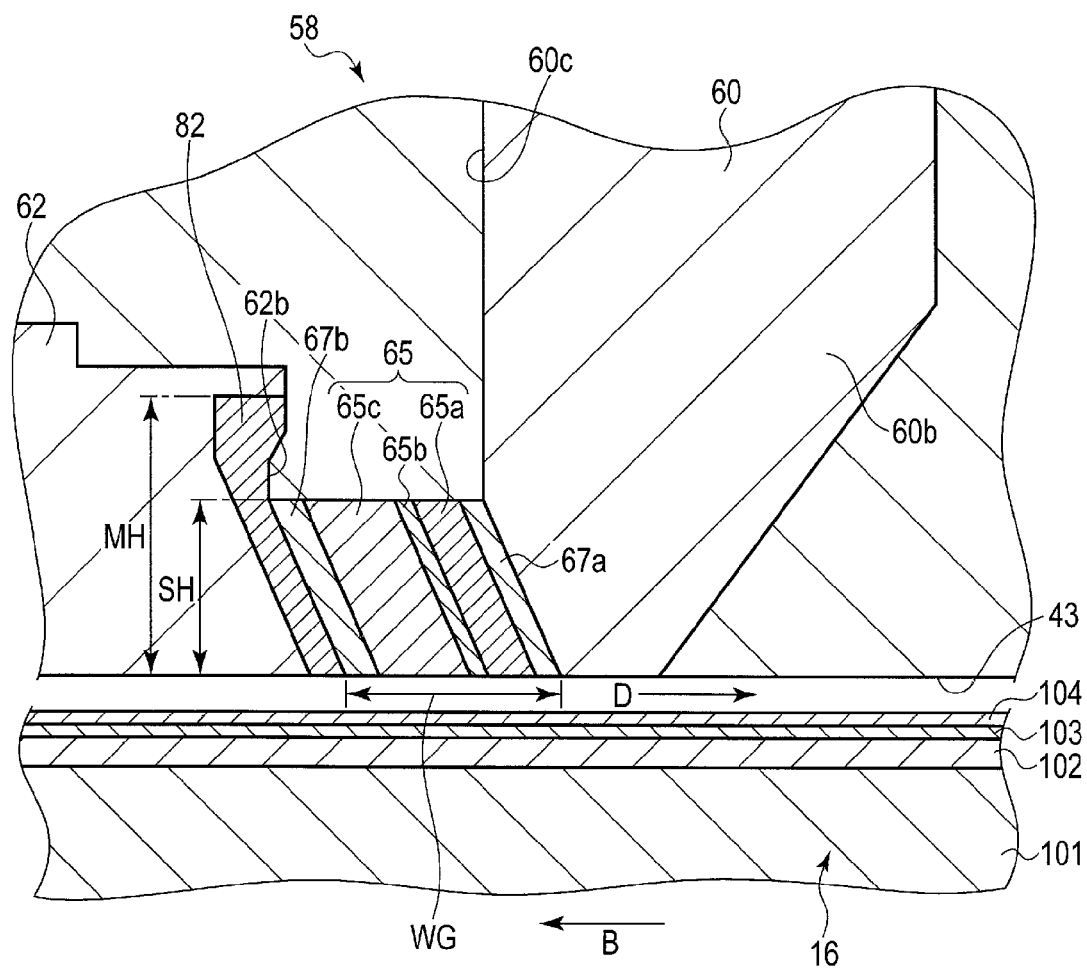
F I G. 18

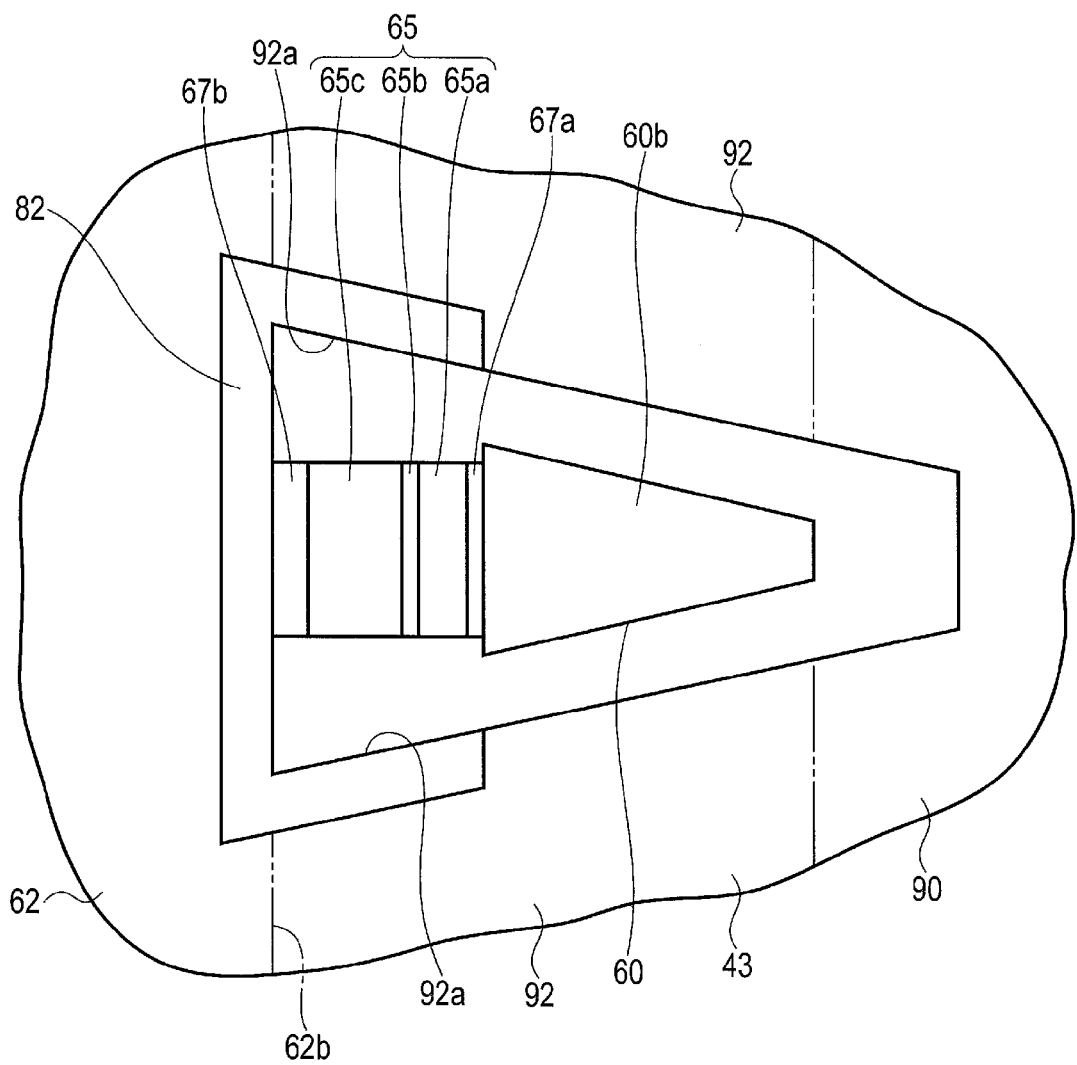
F I G. 20

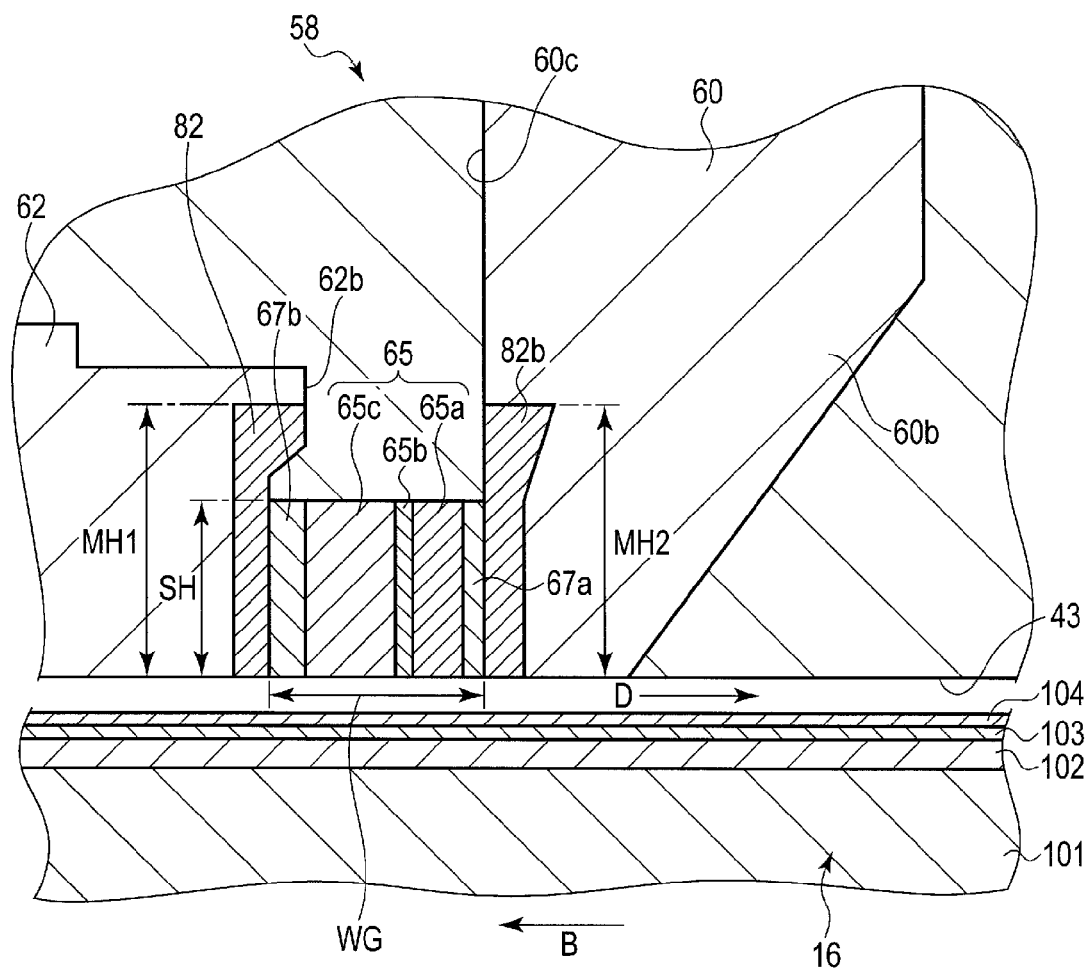
F I G. 21

HIGH FREQUENCY ASSISTED MAGNETIC RECORDING HEAD AND DISK DEVICE COMPRISING THE MAGNETIC RECORDING HEAD

CROSS-REFERENCE TO RELATED APPLICATIONS

This application is based upon and claims the benefit of priority from Japanese Patent Application No. 2015-165492, filed Aug. 25, 2015, the entire contents of which are incorporated herein by reference.

FIELD

Embodiments described herein relate generally to a magnetic recording head comprising a high-frequency-assisted element and a disk device comprising the magnetic recording head.

BACKGROUND

In recent years, a magnetic head for perpendicular magnetic recording has been suggested to realize high recording density, large capacity or miniaturization of a magnetic disk device as a disk device. In this type of magnetic head, a recording head includes a main magnetic pole which produces a perpendicular magnetic field, a write shield magnetic pole provided on the trailing side of the main magnetic pole across an intervening write gap, and a coil for supplying a magnetic flux to the main magnetic pole. Further, there is suggested a high-frequency-assisted head wherein a high-frequency oscillator such as a spin-torque oscillator is provided in the write gap between the write shield magnetic pole and the main magnetic pole. Current is supplied to the spin-torque oscillator through the main magnetic pole and the write shield magnetic pole.

In the high-frequency-assisted head, a spin injection layer and an oscillation layer of the high-frequency oscillator are allocated in the write gap. In the high-frequency-assisted head having such a structure, a phenomenon (spin wave) in which the magnetization near the surface of the write shield or main magnetic pole facing the surface of the oscillation layer fluctuates synchronously with magnetization rotation in the oscillation layer occurs. There is a possibility that the spin wave disturbs magnetization rotation of the high-frequency oscillator and reduces the assist effect.

BRIEF DESCRIPTION OF THE DRAWINGS

FIG. 7 is an enlarged perspective view showing the ABS-side end portion of the recording head.

FIG. 8 is a view schematically showing magnetization rotation in a high-frequency oscillator and an anisotropic magnetic material of the recording head.

FIG. 10 is an enlarged cross-sectional view taken along a track center of an ABS-side end portion of a recording head of an HDD according to a second embodiment.

FIG. 11 is a plan view showing the ABS-side end portion of the recording head of the HDD according to the second embodiment from the ABS side.

FIG. 13 is an enlarged plan view showing an ABS-side end portion of a recording head of an HDD according to a fourth embodiment from the ABS side.

FIG. 15 is an enlarged plan view showing an ABS-side end portion of a recording head of an HDD according to a sixth embodiment from the ABS side.

FIG. 16 is an enlarged cross-sectional view taken along a track center of an ABS-side end portion of a recording head of an HDD according to a seventh embodiment.

FIG. 18 is an enlarged cross-sectional view taken along a track center of an ABS-side end portion of a recording head of an HDD according to a ninth embodiment.

FIG. 20 is an enlarged plan view showing an ABS-side end portion of a recording head of an HDD according to a tenth embodiment from the ABS side.

FIG. 21 is an enlarged cross-sectional view taken along a track center of an ABS-side end portion of a recording head of an HDD according to an eleventh embodiment.

DETAILED DESCRIPTION

Figure 1:
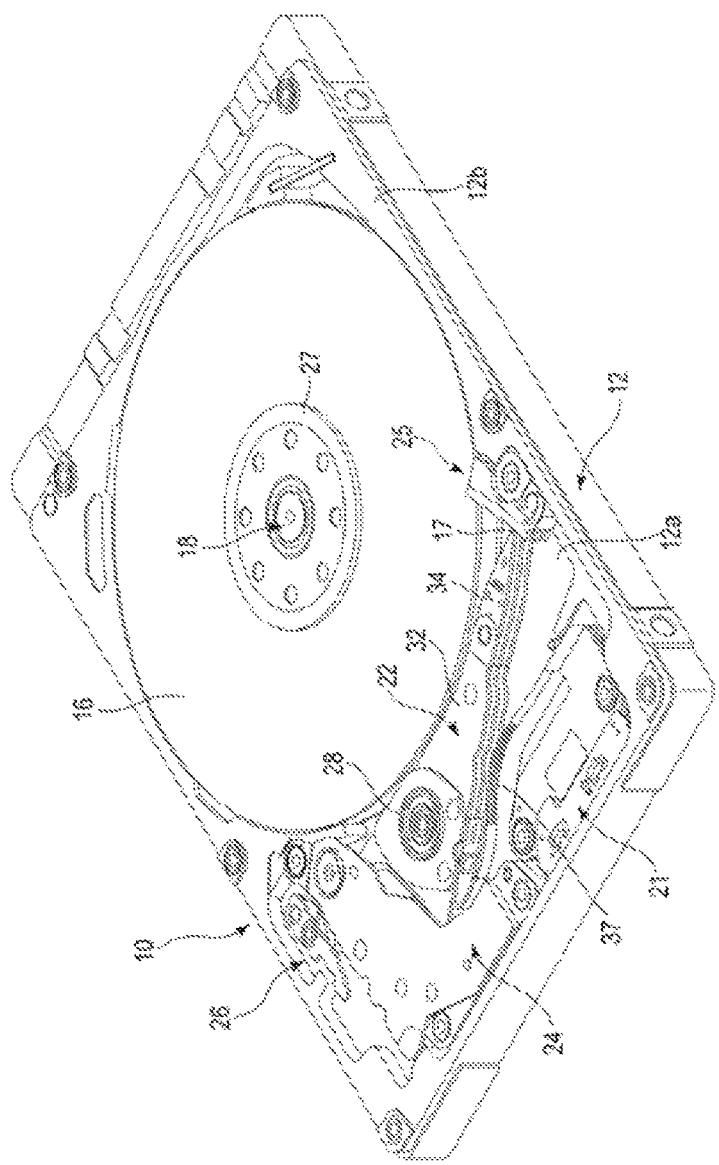
FIG. 1 is a perspective view showing a hard disk drive (HDD) according to a first embodiment.

Various embodiments will be described hereinafter with reference to the accompanying drawings. In general, according to one embodiment, a magnetic recording head comprises: an air-bearing surface; a main magnetic pole which comprises a distal end portion extending to the air-bearing surface and is configured to produce a recording magnetic field; a write shield which is opposed to the distal end portion of the main magnetic pole across a write gap and constitutes a magnetic core together with the main magnetic pole; a high-frequency oscillator which comprises a stacked spin injection layer and a stacked oscillation layer and is provided between the main magnetic pole and the write shield in the write gap, each of the oscillation layer and the spin injection layer comprising a stack surface extending in a direction intersecting with the air-bearing surface; and a magnetic material layer which is provided in at least one of the main magnetic pole and the write shield, faces the high-frequency oscillator, and has negative magnetic anisotropy with respect to a direction intersecting with the stack surfaces of the high-frequency oscillator.

What is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

Figure 2:
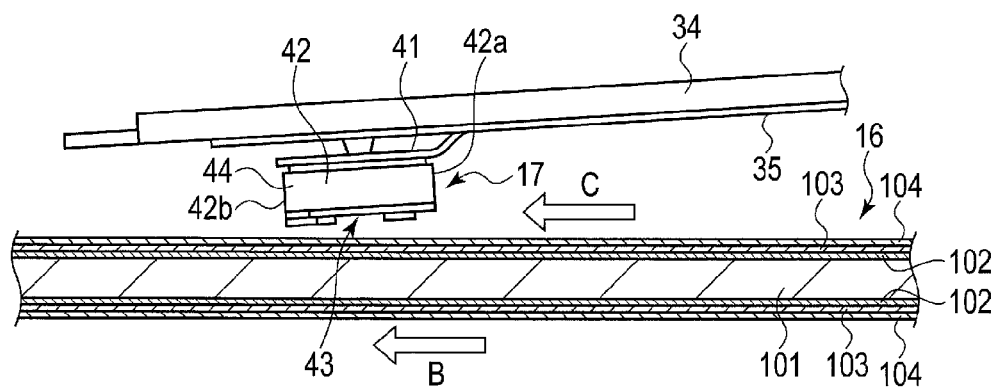
FIG. 2 is a side view showing a magnetic head and a suspension in the HDD.

FIG. 1 shows an internal structure of a hard disk drive (HDD) according to a first embodiment, with a top cover detached therefrom, as a disk device. FIG. 2 shows a magnetic head in a flying state. As shown in FIG. 1, the HDD comprises a housing 10. The housing 10 comprises a base 12 having the shape of a rectangular box which is open on its upper side, and a top cover (not shown) which is secured to the base 12 by screws and closes the upper end opening of the base 12. The base 12 includes a rectangular bottom wall 12a and a side wall 12b provided upright along a peripheral edge of the bottom wall.

In the housing 10 are arranged two magnetic disks 16 serving as recording mediums, and a spindle motor 18 serving as a drive section that supports and rotates the magnetic disks 16. The spindle motor 18 is provided on the bottom wall 12a. Each magnetic disk 16 is formed so as to have a diameter of, for example, 2.5 inches (6.35 cm) and comprises a magnetic recording layer on the upper and lower surfaces. The magnetic disks 16 are engaged coaxially with a hub (not shown) of the spindle motor 18, clamped by a clamp spring 27, and thereby fixed to the hub. The magnetic disks 16 are supported parallel to the bottom wall 12a of the base 12. The magnetic disks 16 are rotated at a predetermined speed by the spindle motor 18.

Magnetic heads 17 and a carriage assembly 22 are arranged in the housing 10. The magnetic heads 17 are configured to write information to and read information from the magnetic disks 16, and the carriage assembly 22 supports the magnetic heads 17 to be movable with respect to the magnetic disks 16. In the housing 10 are arranged a voice coil motor (VCM) 24, a ramp load mechanism 25, a latch mechanism 26 and a flexible printed circuit board (FPC) unit 21. The VCM 24 rotates and positions the carriage assembly 22. The ramp load mechanism 25 holds the magnetic heads 17 in unload positions where they are separated from the magnetic disks 16 when the magnetic heads 17 are moved to outermost circumferential part of the magnetic disks 16. The latch mechanism 26 holds the carriage assembly 22 in a retreat position when an impact or the like acts on the HDD. The FPC unit 21 includes electronic components such as a conversion connector, etc.

A control circuit board (not shown) is screwed to the external surface of the base 12 and faces the bottom wall 12a. The control circuit board controls the operations of the spindle motor 18, the VCM 24 and the magnetic heads 17 through the FPC unit 21.

The carriage assembly 22 comprises a bearing unit 28 secured to the bottom wall 12a of the base 12, arms 32 extending from the bearing unit 28, and suspensions 34 which are capable of elastically deforming and each have the shape of a slender plate. The magnetic heads 17 are supported on the extended ends of the suspensions 34, respectively. The suspensions 34 and the magnetic heads 17 face each other with the magnetic disks 16 interposed.

As shown in FIG. 2, each magnetic head 17 is structured as a flying head, and comprises a slider 42 having the shape of a substantially rectangular parallelepiped and a head portion 44 for writing and reading at the outflow end (trailing end) of the slider 42. The magnetic head 17 is secured to a gimbal spring 41 provided at the distal end portion of the suspension 34. As shown in FIG. 1 and FIG. 2, each magnetic head 17 is electrically connected to the FPC unit 21 via a trace member 35 secured to the suspension 34 and the arm 32, and a relay FPC 37.

Figure 3:
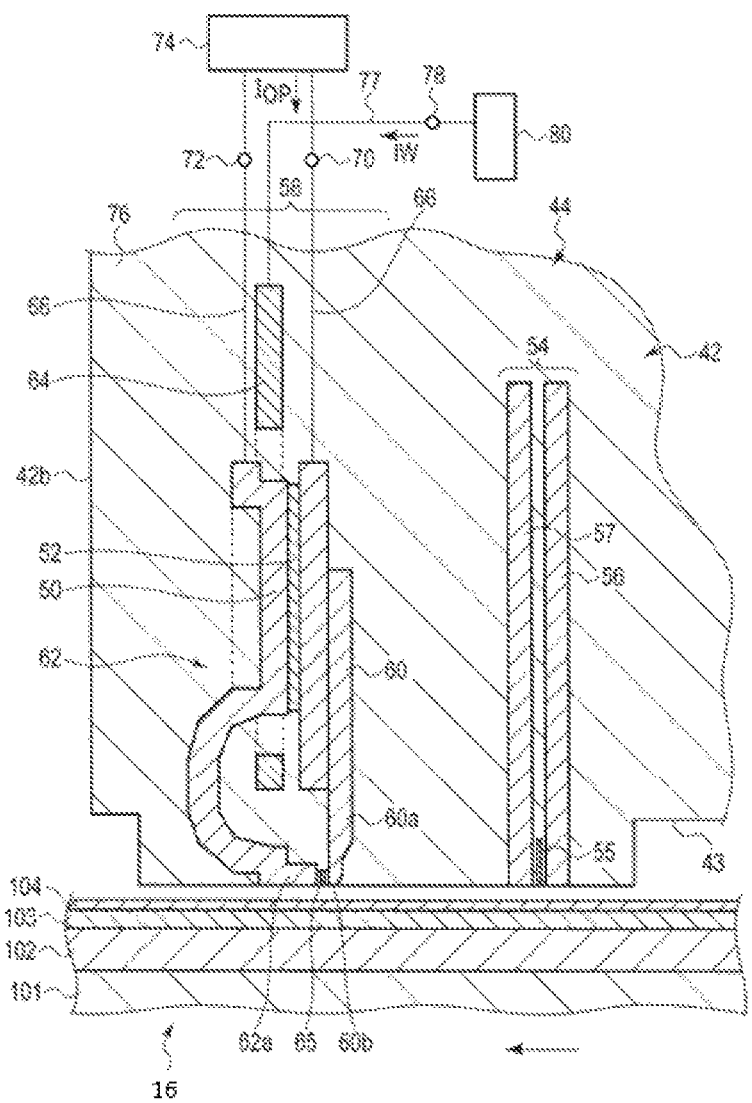
FIG. 3 is an enlarged cross-sectional view showing a head portion of the magnetic head.

Next, the structures of the magnetic disks 16 and the magnetic heads 17 will be described in detail. FIG. 3 is an enlarged cross-sectional view showing the head portion 44 of the magnetic head 17 and the magnetic disk 16.

As shown in FIG. 1 to FIG. 3, the magnetic disk 16 comprises a substrate 101 formed of a nonmagnetic material in the shape of a circular disk having a diameter of, for example, approximately 2.5 inches (6.35 cm). On each surface of the substrate 101, a soft magnetic layer 102 serving as a foundation layer, a magnetic recording layer 103 and a protective film layer 104 are stacked in order. The soft magnetic layer 102 is formed of a material showing soft magnetic properties. The magnetic recording layer 103 has magnetic anisotropy in a direction perpendicular to the disk surface.

As shown in FIG. 2 and FIG. 3, the slider 42 of the magnetic head 17 is formed of, for example, a sintered body of alumina and titanium-carbide (AlTiC). The head portion 44 is formed by stacking thin films. The slider 42 comprises a rectangular disk-facing surface (air-bearing surface [ABS]) 43 facing the surface of the magnetic disk 16. The slider 42 is caused to fly by an air flow C produced between the disk surface and the ABS 43 by the rotation of the magnetic disk 16. The direction of the air flow C conforms to a rotational direction B of the magnetic disk 16. The slider 42 is provided such that the longitudinal direction of the ABS 43 substantially conforms to the direction of the air flow C relative to the surface of the magnetic disk 16.

The slider 42 comprises a leading end 42a located on the inflow side of the air flow C and a trailing end 42b located on the outflow side of the air flow C. On the ABS 43 of the slider 42, for example, a leading step, a trailing step, a side step, a negative-pressure cavity and the like are formed (not shown).

As shown in FIG. 3, the head portion 44 comprises a reading head 54 and a recording head (magnetic recording head) 58 which are formed by a thin-film process at the trailing end 42b of the slider 42. Thus, the head portion 44 is formed as a separation type of magnetic head. The reading head 54 and the recording head 58 are covered with a protective insulating film 76 excluding the portions exposed on the ABS 43 of the slider 42. The protective insulating film 76 forms the outer shape of the head portion 44.

The reading head 54 comprises a magnetic film 55 having a magnetoresistive effect, and shield films 56 and 57 provided on the trailing and leading sides of the magnetic film 55 so as to sandwich the magnetic film 55. The lower ends of the magnetic film 55 and the shield films 56 and 57 are exposed on the ABS 43 of the slider 42.

Figure 5:
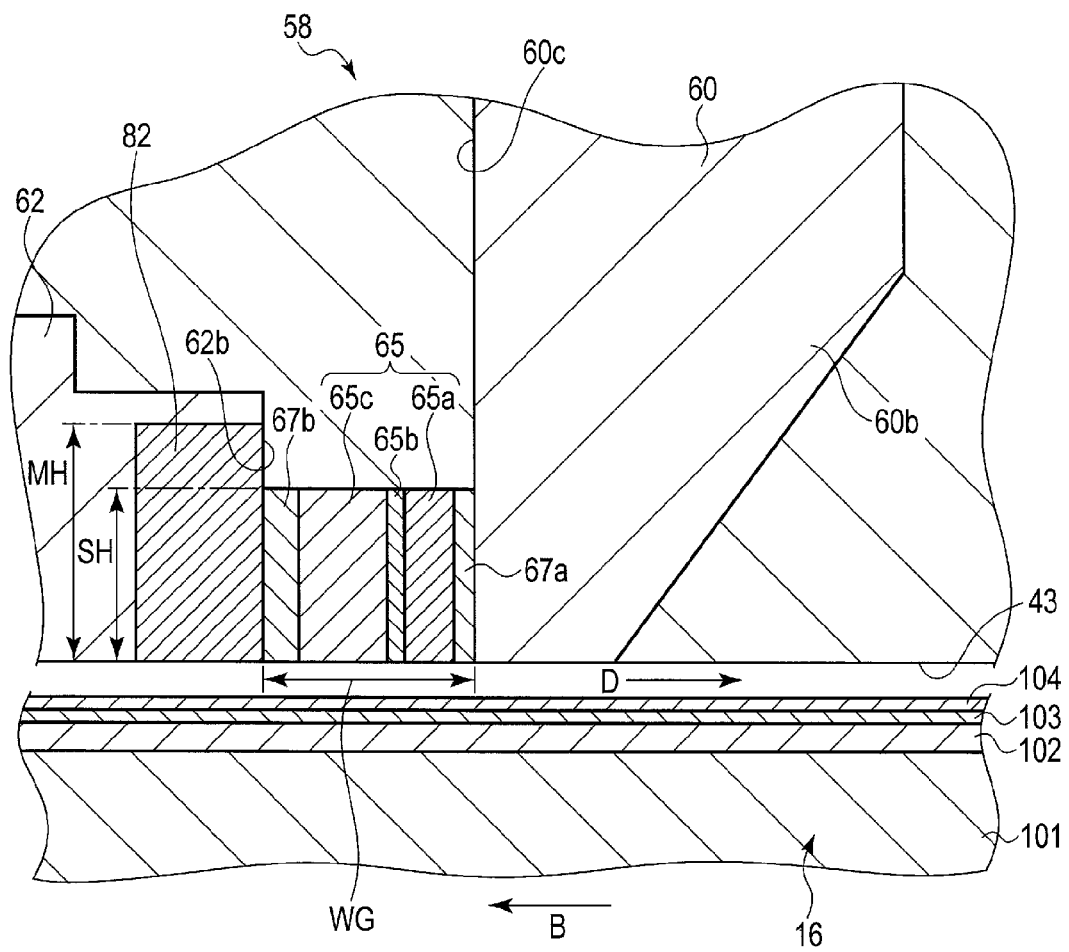
FIG. 5 is an enlarged cross-sectional view taken along a track center of an ABS-side end portion of the recording head.
Figure 4:
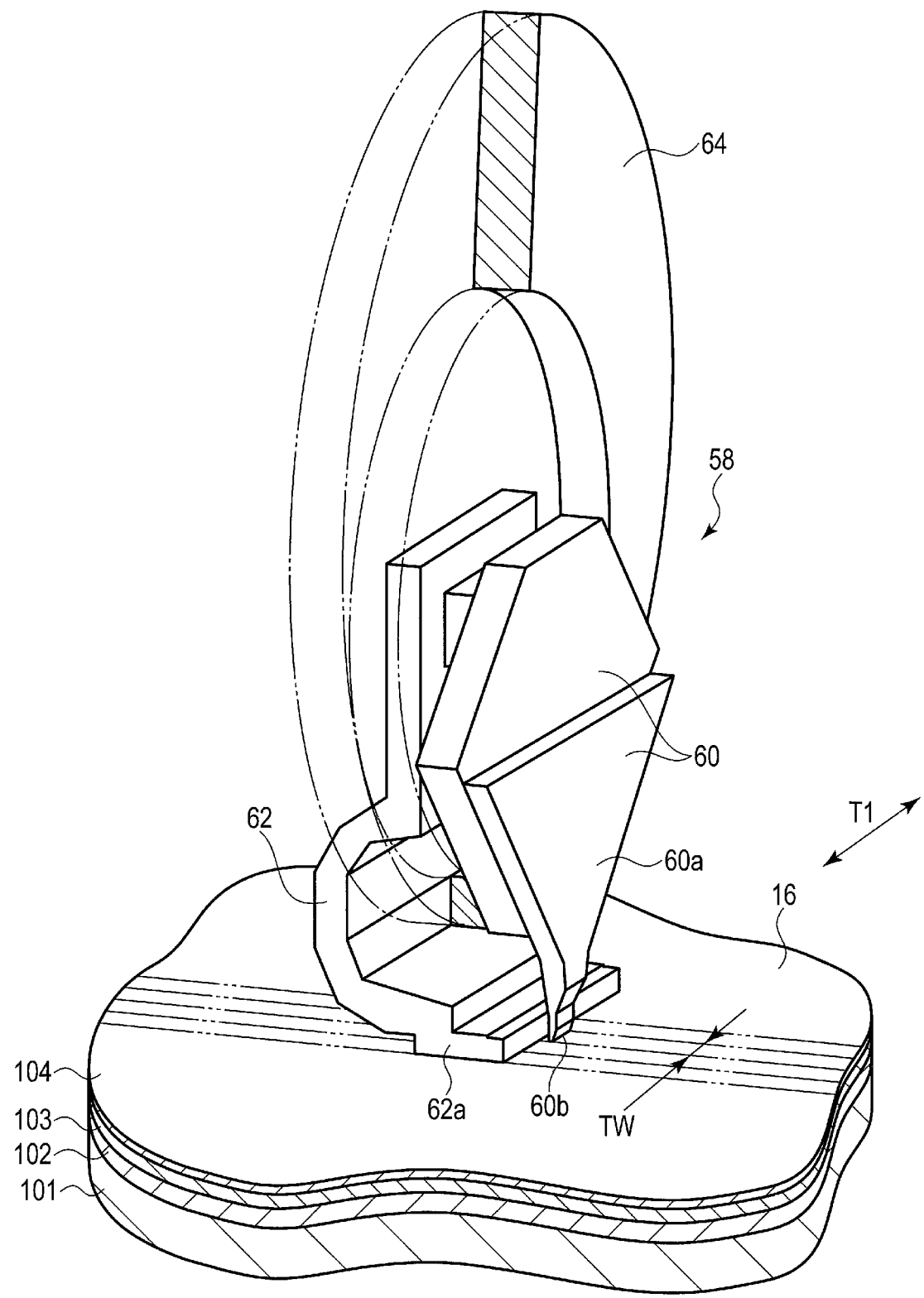
FIG. 4 is a perspective view schematically showing a recording head of the magnetic head.
Figure 6:
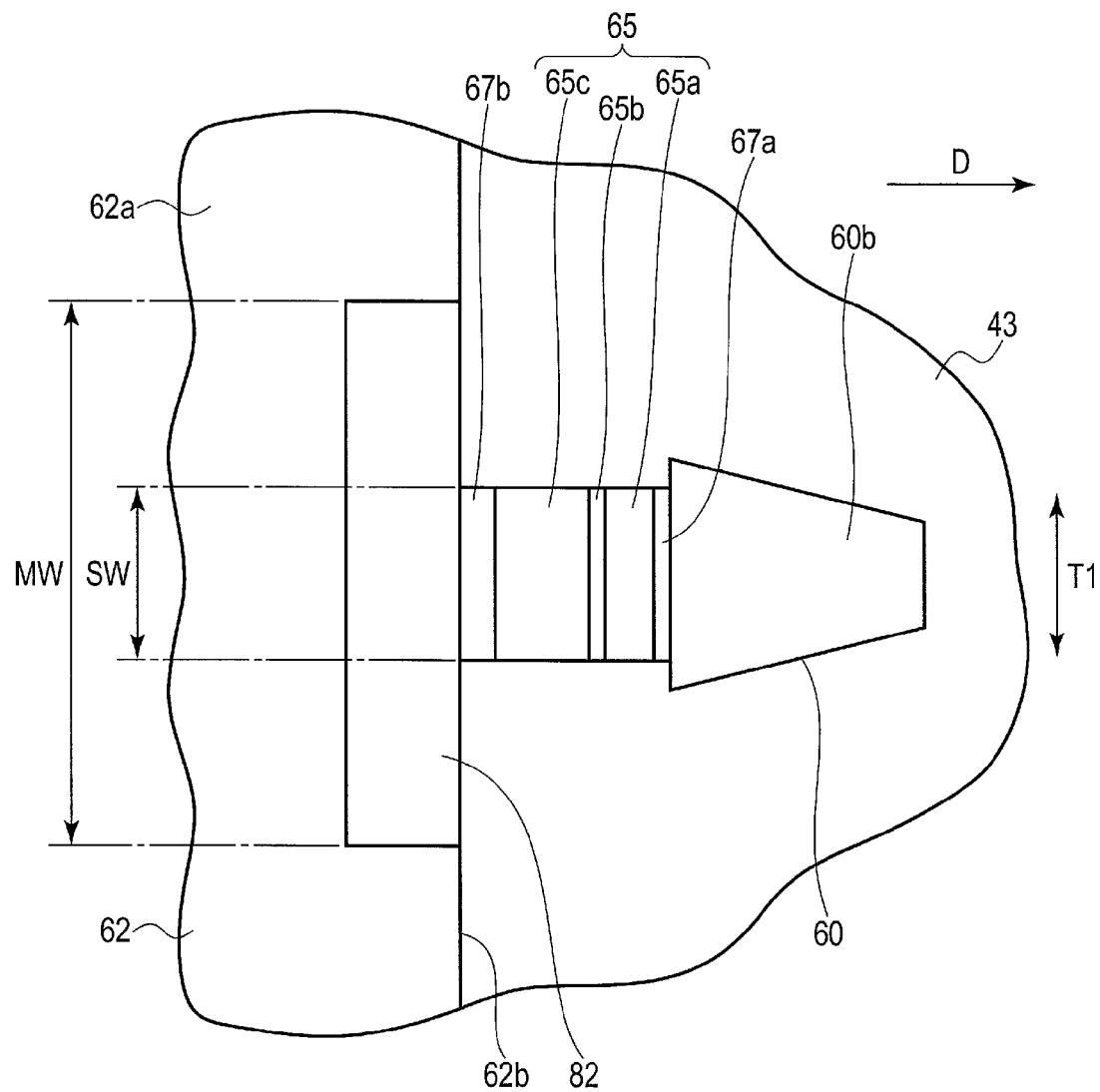
FIG. 6 is an enlarged plan view showing the ABS-side end portion of the recording head from the ABS side.

The recording head 58 is provided on the trailing end 42b side of the slider 42 relative to the reading head 54. FIG. 4 is a perspective view schematically showing the recording head 58 and the magnetic disk 16. FIG. 5 is an enlarged cross-sectional view taken along the track center of the end portion of the recording head 58 on the magnetic disk 16 side. FIG. 6 is an enlarged perspective view showing the end portion of the recording head 58 on the magnetic disk 16 side.

As shown in FIGS. 3 to 5, the recording head 58 comprises a main magnetic pole 60, a trailing shield (write shield) 62, a recording coil 64 and a high-frequency oscillator, for example, a spin torque oscillator (STO) 65. The main magnetic pole 60 is formed of a high-saturated magnetized material producing a recording magnetic field in the direction perpendicular to the surface of the magnetic disk 16. The trailing shield 62 is formed of a soft magnetic material and is provided to effectively close the magnetic path via the soft magnetic layer 102 immediately under the main magnetic pole 60. The recording coil 64 is provided so as to wind around a magnetic core (magnetic circuit) including the main magnetic pole 60 and the trailing shield 62 in order to supply a magnetic flux to the main magnetic pole 60 when a signal is written to the magnetic disk 16. The STO 65 is formed of a nonmagnetic conductive material and is provided in the portion facing the ABS 43 between a distal end portion 60b of the main magnetic pole 60 on the ABS 43 side and the trailing shield 62.

The main magnetic pole 60 formed of a soft magnetic material extends substantially perpendicularly to the surface of the magnetic disk 16 and the ABS 43. The lower end portion of the main magnetic pole 60 on the ABS 43 side comprises a tapered portion 60a and the distal end portion 60b. The tapered portion 60a tapers towards the ABS 43 and narrows into a funnel shape in the track width direction. The distal end portion 60b extends from the tapered portion 60a to the ABS 43 and has a predetermined width. The distal end, in other words, the lower end of the distal end portion 60b is exposed on the ABS 43 of the magnetic head. The width of the distal end portion 60b in the track width direction T1 substantially corresponds to the track width TW in the magnetic disk 16. The main magnetic pole 60 comprises a shield-side end surface 60c which extends substantially perpendicularly to the ABS 43 and faces the trailing side.

The trailing shield 62 formed of a soft magnetic material has a substantially L-shape. The trailing shield 62 comprises a distal end portion 62a facing the distal end portion 60b of the main magnetic pole 60 across an intervening write gap, and a connection portion (back gap portion) 50 which is away from the ABS 43 and is connected to the main magnetic pole 60. The connection portion 50 is connected to the upper portion of the main magnetic pole 60, in other words, to the upper portion away from the ABS 43 to the deep side or the upper side, via a nonconductive material 52.

The distal end portion 62a of the trailing shield 62 is formed in the shape of a slender rectangle. The lower end surface of the trailing shield 62 is exposed on the ABS 43 of the slider 42. A leading-side end surface (main-magnetic-pole-side end surface) 62b of the distal end portion 62a extends substantially perpendicularly to the ABS 43 and extends along the track width direction of the magnetic disk 16. The leading-side end surface 62b faces the shield-side end surface 60c of the main magnetic pole 60 substantially parallel across an intervening write gap WG in the lower end portion of the main magnetic pole 60 (in other words, part of the distal end portion 60b and the tapered portion 60a).

As shown in FIG. 5, FIG. 6 and FIG. 7, the STO 65 is provided between the distal end portion 60b of the main magnetic pole 60 and the trailing shield 62 in the write gap WG and is partially exposed on the ABS 43. The STO 65 comprises a spin injection layer 65a, an intermediate layer (nonmagnetic conductive layer) 65b and an oscillation layer (field generation layer) 65c and is structured by stacking these layers in order from the main magnetic pole 60 side to the trailing shield 62 side; in other words, in a travel direction D of the magnetic head 17. The spin injection layer 65a is connected to the shield-side end surface 60c of the main magnetic pole 60 via a nonmagnetic conductive layer (foundation layer) 67a. The oscillation layer 65c is connected to the leading-side end surface 62b of the trailing shield 62 via a nonmagnetic conductive layer (cap layer) 67b. The stacking order of the spin injection layer 65a, the intermediate layer 65b and the oscillation layer 65c may be opposite to the above order. In other words, these layers may be stacked in order from the trailing shield 62 side to the main magnetic pole 60 side.

Each of the spin injection layer 65a, the intermediate layer 65b and the oscillation layer 65c comprises a stack surface or a film surface extending in a direction intersecting with the ABS 43, for example, in a direction perpendicular to the ABS 43. The lower end surface of the STO 65 is exposed on the ABS 43 and is flush with the ABS 43. The width SW of the STO 65 is substantially less than or equal to the track width TW. The height SH (height in a direction perpendicular to the ABS 43) of the STO 65 is substantially less than or equal to that of the leading-side end surface 62b of the trailing shield 62.

A magnetic material layer (anisotropic magnetic material) 82 is provided in at least one of the trailing shield 62 and the main magnetic pole 60 facing the STO 65, and faces the STO 65. In the present embodiment, the magnetic material layer 82 is provided in the distal end portion of the trailing shield 62. For example, the magnetic material layer 82 is formed in the shape of a rectangle and exposed on the leading-side end surface 62b and the ABS 43. That is, the side surface and the bottom surface of the magnetic material layer 82 constitute part of the leading-side end surface 62b and part of the ABS 43, respectively.

The magnetic material layer 82 is a magnetic material having negative magnetic anisotropy with respect to a direction intersecting with the film surface (stack surface) of the oscillation layer 65c of the STO 65, for example, in a direction perpendicular to the film surface. In other words, the magnetic material layer 82 is formed of a magnetic material in which the direction perpendicular to the film surface of the oscillation layer 65c is a direction of axis of hard magnetization. As such a magnetic material having the negative magnetic anisotropy, for example, hop-CoIr alloy can be used.

The area of a facing surface of the magnetic material layer 82 facing the STO 65, i.e., the area of the magnetic material layer 82 exposed on the leading-side end surface 62b, is greater than the area of a facing surface (film surface) of the oscillation layer 65c. For example, on the leading-side end surface 62b, the height MH (height from the ABS 43 in a depth direction) of the magnetic material layer 82 is greater than the height SH of the STO 65. On the leading-side end surface 62b, the width MW (width in the track width direction T1) of the magnetic material layer 82 is greater than the width SW of the STO 65. Therefore, the magnetic material layer 82 faces the entire stack surface of the STO 65 and extends to the upper side and to both sides in the width direction across the outer edge of the STO 65.

The thickness of the magnetic material layer 82 i.e., the thickness in the direction perpendicular to the film surface of the STO 65 can be arbitrarily adjusted.

As shown in FIG. 3, the main magnetic pole 60 and the trailing shield 62 are connected to a power source 74 via an interconnection 66 and connection terminals 70 and 72. A current circuit is structured such that current Iop can be supplied from the power source 74 through the interconnection 66, the main magnetic pole 60, the STO 65 and the trailing shield 62 in series.

For example, the recording coil 64 winds around the connection portion 50 between the main magnetic pole 60 and the trailing shield 62. The recording coil 64 is connected to a terminal 78 via an interconnection 77. A second power source 80 is connected to the terminal 78. Recording current Iw supplied from the second power source 80 to the recording coil 64 is controlled by the control unit of the HDD. When a signal is written to the magnetic disk 16, predetermined recording current Iw is supplied from the second power source 80 to the recording coil 64 and a magnetic flux is supplied to the main magnetic pole 60, thereby producing a recording magnetic field.

In the HDD structured in the above manner, when the VCM 24 is driven, the carriage assembly 22 is rotated. The magnetic head 17 is moved to the desired track of the magnetic disk 16, and the position of the magnetic head 17 is determined. As shown in FIG. 2, the magnetic head 17 is caused to fly by the air flow C produced between the disk surface and the ABS 43 because of the rotation of the magnetic disk 16. When the HDD is operated, the ABS 43 of the slider 42 faces the disk surface, maintaining a space from the disk surface. In this state, data is read from the magnetic disk 16 by the reading head 54 and written to the magnetic disk 16 by the recording head 58.

In writing data, as shown in FIG. 3, direct current is supplied from the power source 74 to the main magnetic pole 60, the STO 65 and the trailing shield 62. Thus, a high-frequency magnetic field is produced from the STO 65. This high-frequency magnetic field is applied to the magnetic recording layer 103 of the magnetic disk 16. Alternating current is supplied from the power source 80 to the recording coil 64, and thus, the main magnetic pole 60 is excited by the recording coil 64. From the main magnetic pole 60, a recording magnetic field is perpendicularly applied to the recording layer 103 of the magnetic disk 16 immediately under the main magnetic pole 60. In this manner, data is recorded in the magnetic recording layer 103 with a desired track width. By superimposing a high-frequency magnetic field on the recording magnetic field, the magnetization inversion of the magnetic recording layer 103 is stimulated. Thus, it is possible to perform magnetic recording of high magnetic anisotropy energy. By supplying current from the main magnetic pole 60 to the trailing shield 62, the disorder in the magnetic domain of the main magnetic pole 60 can be eliminated. Thus, an efficient magnetic path can be obtained and the magnetic field produced from the distal end of the main magnetic pole 60 can be enhanced.

In addition, in the above-described embodiment, the magnetic material layer 82 having negative magnetic anisotropy is provided on the leading-side end surface 62b of the trailing shield 62 facing the oscillation layer 65c of the STO 65 in the recording head 58. As schematically shown in FIG. 8, a direction D1 of axis of hard magnetization of the magnetic material layer 82 is a direction perpendicular to the film surface of the STO 65. Accordingly, with respect to a high-frequency response, the direction D1 of axis of hard magnetization of the magnetic material layer 82 is a direction perpendicular to an in-plane magnetization rotation R1 of the oscillation layer 65c, and the magnetization of the trailing shield 62 does not move in combination with the magnetization of the oscillation layer 65c. That is, magnetization rotation (spin wave) in the STO-facing surface in the trailing shield 62 is suppressed. Therefore, the magnetization rotation of the oscillation layer 65c is excellently performed without being disturbed by such a spin wave, which increases the oscillating magnetic field of the STO 65. As a result, the magnetic field assist effect applied to the magnetic disk from the STO 65 is increased, the recording ability is improved, and high recording density can be thereby realized.

Figure 9:
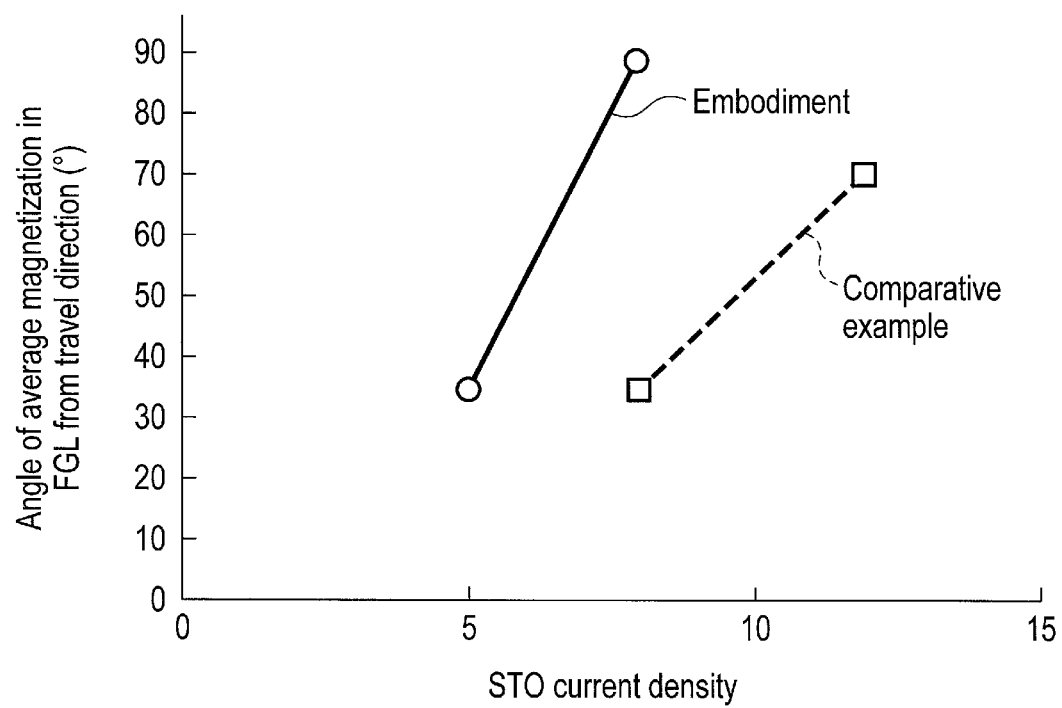
FIG. 9 is a graph showing a relationship between current density of the high-frequency oscillator (STO) and a direction (angle) of average in-plane magnetization in the oscillation layer comparing the recording head of the first embodiment and a recording head of a comparative example.

FIG. 9 is a graph showing the relationship between STO current density of direct current applied in a direction substantially perpendicular to the film surface of the oscillation layer of the STO and the angle of magnetization of the oscillation layer with respect to the direction perpendicular to the film surface, comparing the recording head of the first embodiment and a recording head of a comparative example without an anisotropic magnetic material layer. The graph shows that good oscillation of the oscillation layer of the STO can be obtained, i.e., oscillation can be obtained by low current density, when the rotation is performed in the film surface of the oscillation layer while the angle of magnetization is 90° with respect to the direction perpendicular to the film surface. In the comparative example, the angle of magnetization does not reach 90° and remains about 70° even if the current density is increased. In contrast, in the recording head of the present embodiment, the angle of magnetization is 90° and good oscillation is obtained by low current density.

In the above manner, the present embodiment can provide a magnetic recording head realizing stable high-frequency assist and high recording density and a disk device comprising the magnetic recording head.

The following is a description of magnetic recording heads of HDDs according to alternative embodiments. In the description of these alternative embodiments to follow, like reference numbers are used to designate the same parts as those of the first embodiment, and a detailed description thereof is omitted. Elements different from those of the first embodiment are mainly explained in detail.

Second Embodiment

FIG. 10 is an enlarged cross-sectional view taken along a track center of a distal end portion of a magnetic recording head in an HDD according to a second embodiment. FIG. 11 is a plan view showing the distal end portion of the magnetic recording head from the ABS side. In the present embodiment, a magnetic material layer 82 is provided on a leading-side end surface 62b of a trailing shield 62 and faces an STO 65. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width MW of the magnetic material layer 82 in the track width direction is greater than the width SW of the oscillation layer 65c. In addition, the magnetic material layer 82 is formed such that the thickness of both side portions in the track width direction is greater than the thickness of a center portion in the track width direction. That is, a portion of the leading-side end surface 62b in contact with the STO 65 is formed into a concave portion 84. The other structures of the HDD of the second embodiment are the same as those of the first embodiment.

Third Embodiment

Figure 12:
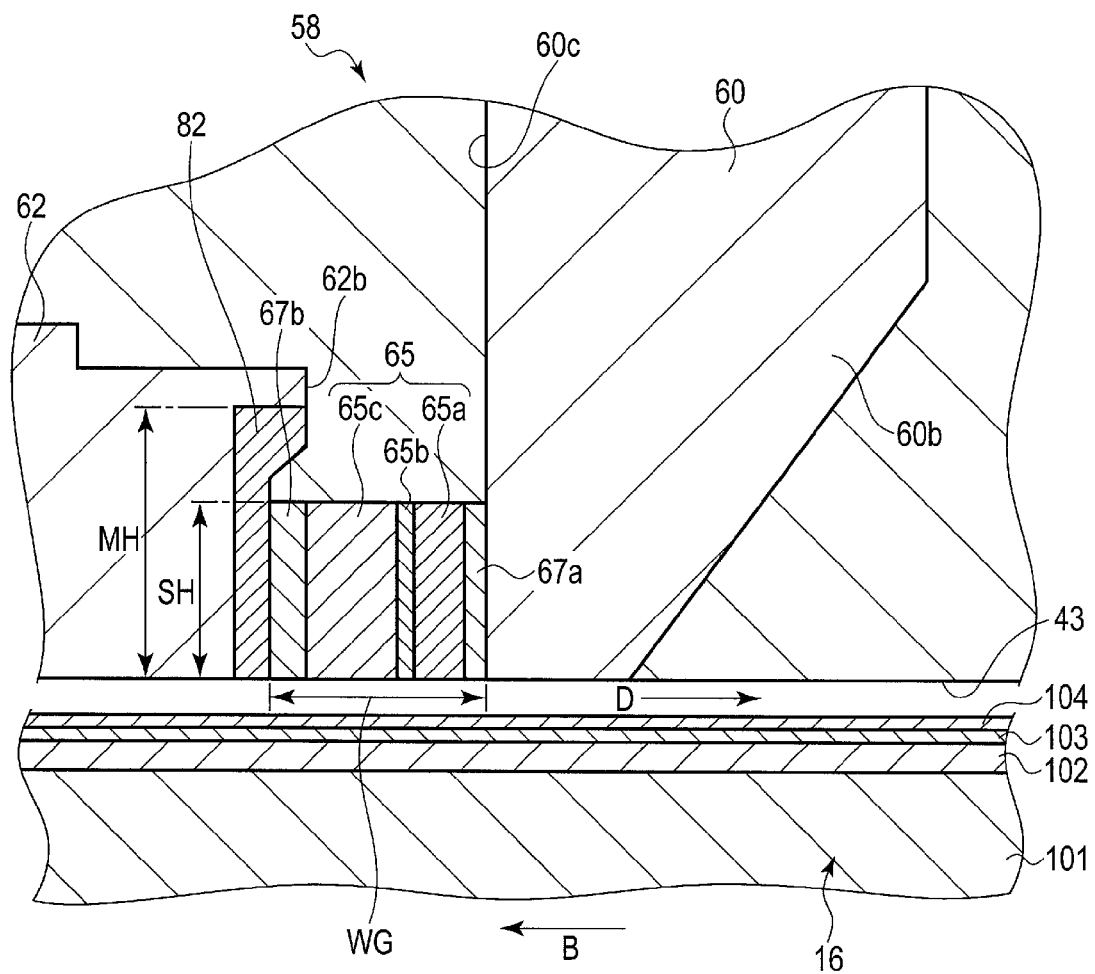
FIG. 12 is an enlarged cross-sectional view taken along a track center of an ABS-side end portion of a recording head of an HDD according to a third embodiment.

FIG. 12 is an enlarged cross-sectional view taken along a track center of a distal end portion of a magnetic recording head in an HDD according to a third embodiment. In the present embodiment, a magnetic material layer 82 is provided on a leading-side end surface 62b of a trailing shield 62 and faces an STO 65. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width of the magnetic material layer 82 in the track width direction is greater than the width of the oscillation layer 65c. In addition, the magnetic material layer 82 is formed such that the thickness (film thickness) of an upper portion is greater than the thickness of a lower portion in the height direction. That is, a portion of the leading-side end surface 62b in contact with the STO 65 is formed into a concave portion and a portion above the STO 65 protrudes to the STO side. The other structures of the HDD of the third embodiment are the same as those of the first embodiment.

Fourth Embodiment

FIG. 13 is a plan view showing a distal end portion of a magnetic recording head in an HDD according to a fourth embodiment from the ABS side. In the present embodiment, a magnetic material layer 82 is provided on a leading-side end surface 62b of a trailing shield 62 and faces an STO 65. The magnetic material layer 82 has negative magnetic anisotropy with respect to a direction perpendicular to a film surface of an oscillation layer 65c of the STO 65. The height of the magnetic material layer 82 is greater than the height of the oscillation layer 65c. The width MW of the magnetic material layer 82 in the track width direction is greater than the width SW of the oscillation layer 65c. In addition, the magnetic material layer 82 is formed such that the thickness of both side portions in the track width direction is greater than the thickness of a center portion (area facing the STO 65) in the track width direction. In the present embodiment, the leading-side end surface 62b on which the magnetic material layer 82 is exposed is flat, and a central portion of the end surface of the magnetic material layer 82 located on the opposite side of the leading-side end surface 62b in the width direction is concaved toward the leading-side end surface 62b. The other structures of the HDD of the fourth embodiment are the same as those of the first embodiment.

Fifth Embodiment

Figure 14:
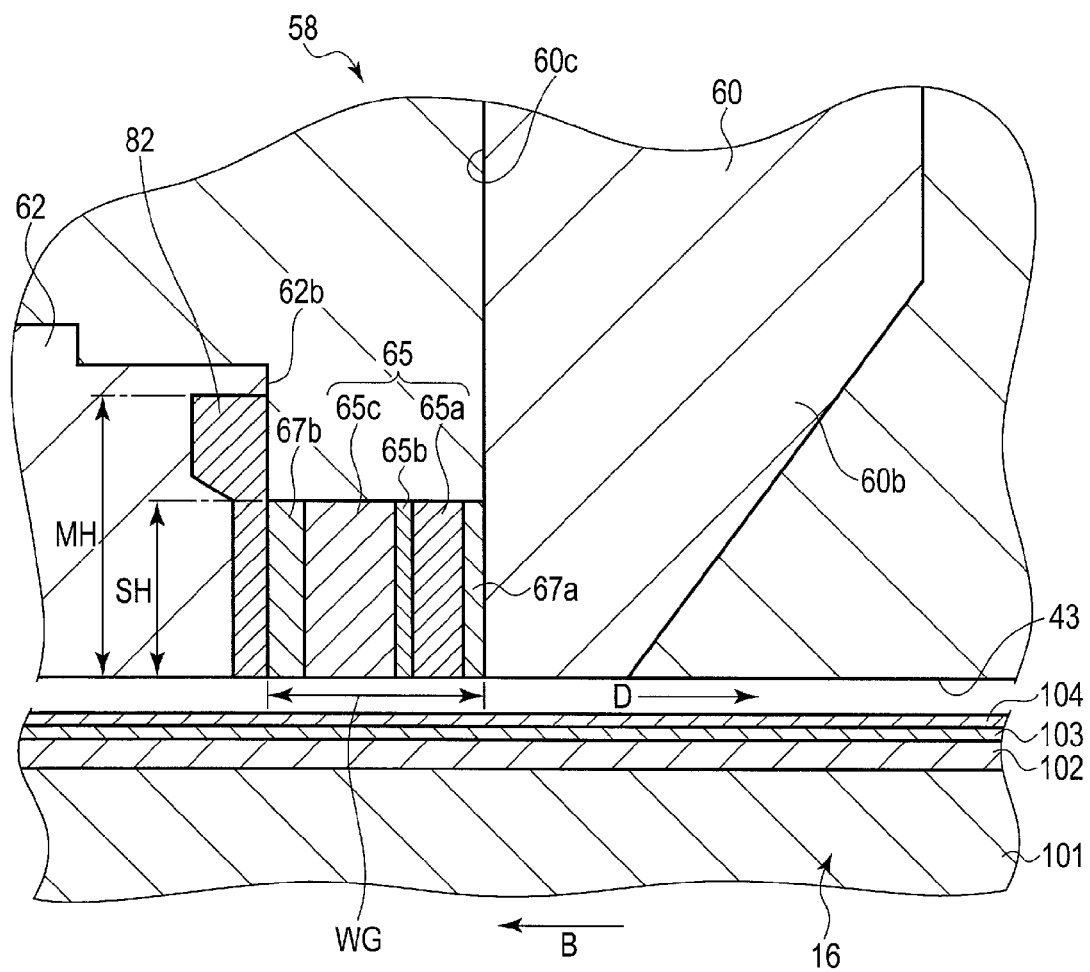
FIG. 14 is an enlarged cross-sectional view taken along a track center of an ABS-side end portion of a recording head of an HDD according to a fifth embodiment.

FIG. 14 is an enlarged cross-sectional view taken along a track center of a distal end portion of a magnetic recording head in an HDD according to a fifth embodiment. In the present embodiment, a magnetic material layer 82 is provided on a leading-side end surface 62b of a trailing shield 62 and faces an STO 65. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width of the magnetic material layer 82 in a track width direction is greater than the width of the oscillation layer 65c. In addition, the magnetic material layer 82 is formed such that the thickness (film thickness) of an upper portion is greater than the thickness of a lower portion in the height direction. In the present embodiment, the leading-side end surface 62b on which the magnetic material layer 82 is exposed is flat, and a lower half of the end surface of the magnetic material layer 82 located on the opposite side of the leading-side end surface 62b (i.e., the lower half on the side of the ABS 43 [area facing the STO 65]) has concavity toward the leading-side end surface 62b. The other structures of the HDD of the fifth embodiment are the same as those of the first embodiment.

In the second to fifth embodiments, reduction of a gap magnetic field caused by the magnetic material layer 82 can be suppressed by reducing the thickness of a portion of the magnetic material layer 82 facing the STO 65, and generation of spin wave can be efficiently prevented by increasing the thickness of both side portions in the width direction or an upper portion positioned away from the STO 65. An effect similar to that of the first embodiment can be obtained in the second to fifth embodiments.

Sixth Embodiment

FIG. 15 is a plan view showing a distal end portion of a magnetic recording head in an HDD according to a sixth embodiment from the ABS side. In the present embodiment, a magnetic material layer 82 is provided on a leading-side end surface 62b of a trailing shield 62 and faces an STO 65. The magnetic material layer 82 has negative magnetic anisotropy with respect to a direction perpendicular to a film surface of an oscillation layer 65c of the STO 65. The width MW of the magnetic material layer 82 in the track width direction is greater than the width SW of the oscillation layer 65c. In the magnetic material layer 82 constituting the leading-side end surface 62b, a portion in contact with the STO 65 is formed into a concave portion 84. In other words, both side portions of the magnetic material layer 82 in the track width direction are bent toward the STO 65 side. In addition, the thickness (film thickness) of the magnetic material layer 82 is constant across the full width in the track width direction. The other structures of the HDD of the sixth embodiment are the same as those of the first embodiment.

Seventh Embodiment

FIG. 16 is an enlarged cross-sectional view taken along a track center of a distal end portion of a magnetic recording head in an HDD according to a seventh embodiment. In the present embodiment, a magnetic material layer 82 is provided in a main magnetic pole 60. That is, the magnetic material layer 82 is provided in a distal end portion 60b of the main magnetic pole 60, faces an STO 65 and is exposed on a shield-side end surface 60c and an ABS 43. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width of the magnetic material layer 82 in the track width direction is greater than the width of the oscillation layer 65c. The shield-side end surface 60c constituted by the magnetic material layer 82 is flat, and a film thickness of the magnetic material layer 82 is constant. The other structures of the HDD of the seventh embodiment are the same as those of the first embodiment.

Eighth Embodiment

Figure 17:
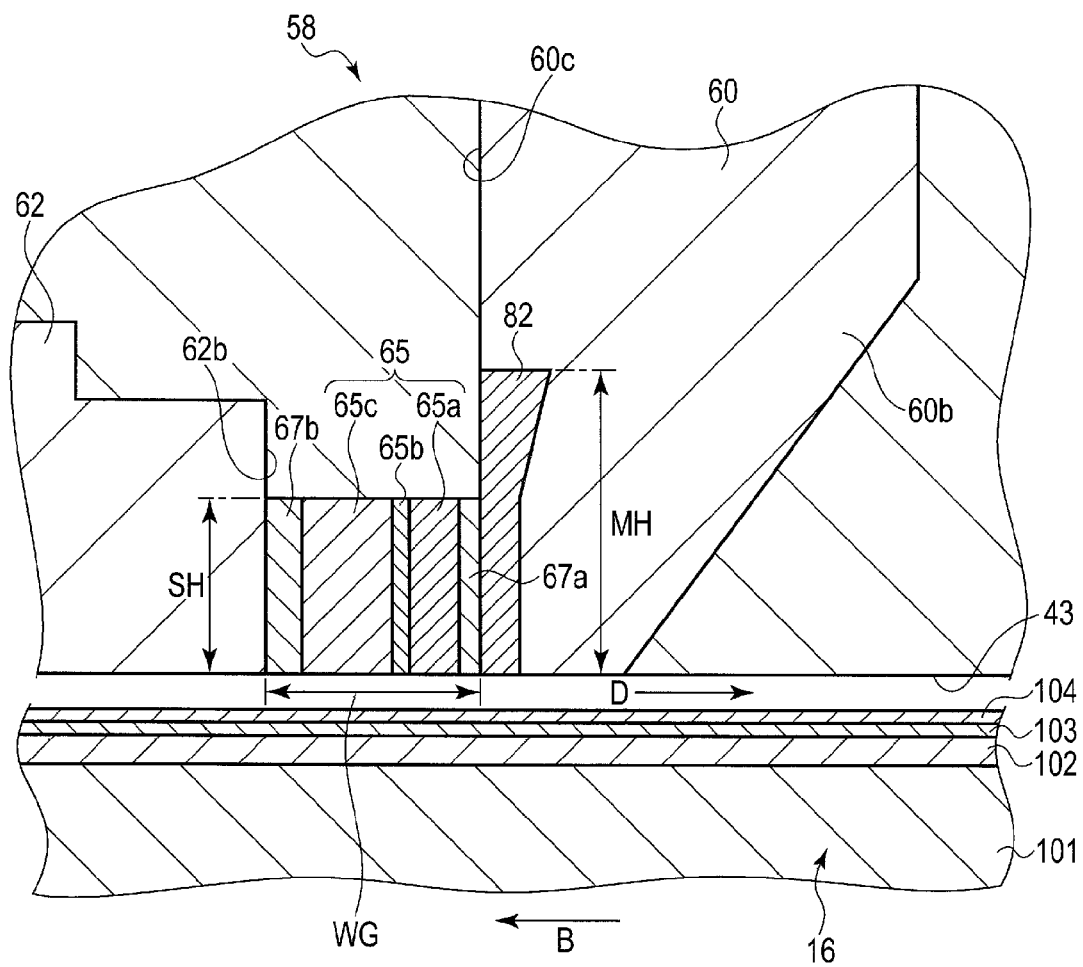
FIG. 17 is an enlarged cross-sectional view taken along a track center of an ABS-side end portion of a recording head of an HDD according to a eighth embodiment.

FIG. 17 is an enlarged cross-sectional view taken along a track center of a distal end portion of a magnetic recording head in an HDD according to a eighth embodiment. In the present embodiment, a magnetic material layer 82 is provided in a distal end portion 60b of a main magnetic pole 60, faces an STO 65 and is exposed on a shield-side end surface 60c and an ABS 43. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width of the magnetic material layer 82 in the track width direction is greater than the width of the oscillation layer 65c. In addition, the magnetic material layer 82 is formed such that the thickness (film thickness) of an upper portion is greater than the thickness of a lower portion facing the STO 65 in the height direction. In the present embodiment, the shield-side end surface 60c on which the magnetic material layer 82 is exposed is flat, and a lower half of the end surface of the magnetic material layer 82 located on the opposite side of the shield-side end surface 60c (i.e., the lower half on the side of the ABS 43 [area facing the STO 65]) has concavity toward the shield-side end surface 60c. The other structures of the HDD of the eighth embodiment are the same as those of the first embodiment.

Ninth Embodiment

Figure 19:
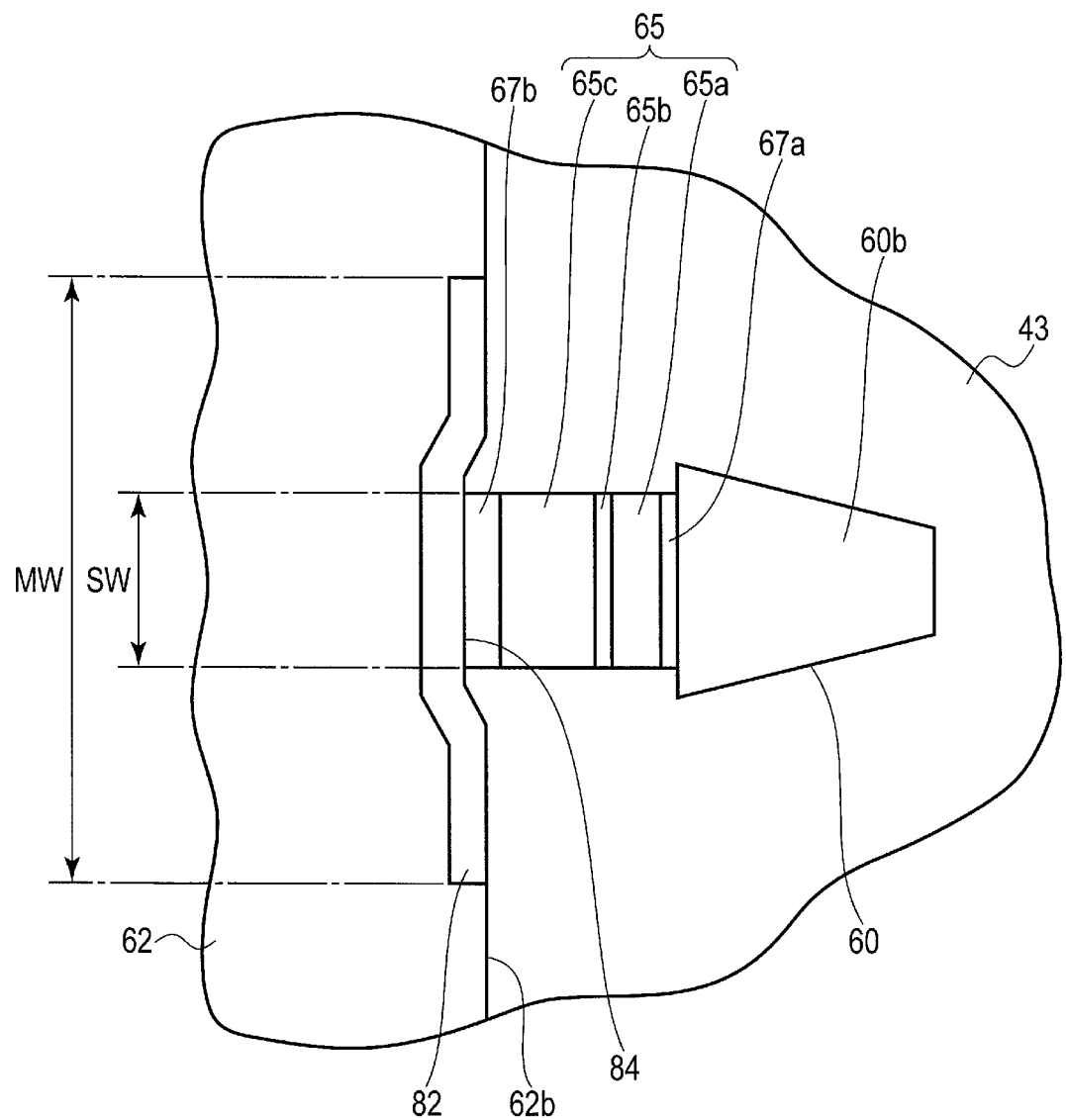
FIG. 19 is an enlarged plan view showing the ABS-side end portion of the recording head of the HDD according to the ninth embodiment from the ABS side.

FIG. 18 is an enlarged cross-sectional view taken along a track center of a distal end portion of a magnetic recording head in an HDD according to a ninth embodiment. FIG. 19 is a plan view showing the distal end portion of the magnetic recording head from the ABS side. In the present embodiment, an ABS-side end portion of a shield-side end surface 60 of a main magnetic pole 60 facing an STO 65 and a lower half of a leading-side end surface 62b of a trailing shield 62 facing the STO 65 are inclined toward the trailing side with respect to a plane perpendicular to an ABS 43. In accordance with this, a film surface (stack surface) of each layer of the STO 65 provided in a write gap WG between the shield-side end surface 60c of the main magnetic pole 60 and the leading-side end surface 62b of the trailing shield 62 is also inclined toward the trailing side with respect to the plane perpendicular to the ABS 43.

A magnetic material layer 82 is provided on the leading-side end surface 62b of the trailing shield 62, is exposed on the leading-side end surface 62b and the ABS 43, and faces the STO 65. The magnetic material layer 82 has negative magnetic anisotropy with respect to a direction perpendicular to a film surface of an oscillation layer 65c of the STO 65. The height MH of the magnetic material layer 82 is greater than the height SH of the oscillation layer 65c. The width MW of the magnetic material layer 82 in the track width direction is greater than or equal to the width SW of the oscillation layer 65c. The magnetic material layer 82 is formed such that the thickness (film thickness) of an upper portion is greater than the thickness of a lower portion facing the STO 65 in the height direction. In addition, the magnetic material layer 82 constituting the leading-side end surface 62b is bent such that a portion in contact with the STO 65 is formed into a concave portion 84. The magnetic material layer 82 may be formed such that the thickness of a center portion in the track width direction is greater than the thickness of both side portions in the track width direction. The other structures of the HDD of the ninth embodiment are the same as those of the first embodiment.

Tenth Embodiment

FIG. 20 is a plan view showing a distal end portion of a magnetic recording head in an HDD according to a tenth embodiment from the ABS side. In the present embodiment, a magnetic recording head 58 further comprises a leading shield 90 positioned with a gap on the leading side of a main magnetic pole 60, and a pair of side shields 92 positioned with gaps on both sides of the main magnetic pole 60 in the width direction. The leading shield 90 and the side shields 92 are formed integrally with a trailing shield 62 to surround a distal end portion 60b of the main magnetic pole 60 and a write gap WG.

A magnetic material layer 82 is continuously provided on a leading-side end surface 62b of the trailing shield 62 and facing surfaces 92a of the side shields 92 positioned on both sides of an STO 65 and facing the STO 65, and faces the STO 65. The magnetic material layer 82 has negative magnetic anisotropy with respect to a direction perpendicular to a film surface (stack surface) of an oscillation layer 65c of the STO 65. The width MW of the magnetic material layer 82 in the track width direction is greater than the width SW of the oscillation layer 65c. The area of a facing surface of the magnetic material layer 82 facing the STO 65 is greater than the area of the facing surface (stack surface) of the oscillation layer 65c. The magnetic material layer 82 may have a constant thickness (film thickness) across the full width in the track width direction, or have a greater thickness in an upper portion in the height direction or both side portions in the track width direction. The other structures of the HDD of the tenth embodiment are the same as those of the first embodiment.

Eleventh Embodiment

FIG. 21 is an enlarged cross-sectional view taken along a track center of a distal end portion of a magnetic recording head in an HDD according to an eleventh embodiment. In the present embodiment, a magnetic material layer 82 is provided on a leading-side end surface 62b of a trailing shield 62 and faces an STO 65. In addition, a magnetic material layer (anisotropic magnetic material) 82b is provided in a distal end portion 60b of a main magnetic pole 60, faces the STO 65 and is exposed on a shield-side end surface 60c and an ABS 43. The magnetic material layers 82 and 82b have negative magnetic anisotropy with respect to a direction perpendicular to a film surface of an oscillation layer 65c of the STO 65. The heights MH1 and MH2 of the magnetic material layers 82 and 82b are each greater than the height SH of the oscillation layer 65c. The widths of the magnetic material layers 82 and 82b in the track width direction are each greater than or equal to the width of the oscillation layer 65c.

The magnetic material layer 82 is formed such that a thickness (film thickness) of an upper portion is greater than a thickness of a lower portion facing the STO 65 in a height direction. The magnetic material layer 82b is formed such that the thickness (film thickness) of the upper portion is greater than the thickness of the lower portion facing the STO 65 in the height direction. The other structures of the HDD of the eleventh embodiment are the same as those of the first embodiment.

In the sixth to eleventh embodiments, similarly to the first embodiment, magnetization rotation (spin wave) in an STO-facing surface of the trailing shield and/or the main magnetic pole can be suppressed and the magnetization rotation of the STO can be excellently performed, by the magnetic material layers 82 and 82b. As a result, the magnetic field assist effect applied to the magnetic disk from the STO is increased, the recording ability is improved, and the high recording density can be thereby realized.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes and sizes of elements constituting the head portion can be changed depending on the need. The shape of the anisotropic magnetic material of the recording head is not limited to a rectangle and may be arbitrary changed as long as the area of the surface facing the high-frequency oscillator is greater than the area of the film surface (stack surface) of the high-frequency oscillation layer. In the magnetic disk device, the number of magnetic disks and magnetic heads can be increased depending on the need. The size of the magnetic disks can be selected in various ways.

What is claimed is:

1. A magnetic recording head comprising:
   an air-bearing surface;
   a main magnetic pole which comprises a distal end portion extending to the air-bearing surface and is configured to produce a recording magnetic field;
   a write shield which is opposed to the distal end portion of the main magnetic pole across a write gap;
   a high-frequency oscillator which comprises a stacked spin injection layer and a stacked oscillation layer and is provided between the main magnetic pole and the write shield in the write gap, each of the oscillation layer and the spin injection layer comprising a stack surface extending in a direction intersecting with the air-bearing surface; and
   a magnetic material layer which is provided in at least one of the main magnetic pole and the write shield, faces the high-frequency oscillator, and has negative magnetic anisotropy with respect to a direction intersecting with the stack surfaces of the high-frequency oscillator.

2. The magnetic recording head of claim 1, wherein an area of a facing surface of the magnetic material layer facing the oscillation layer is greater than an area of the stack surface of the oscillation layer.

3. The magnetic recording head of claim 2, wherein a height of the magnetic material layer from the air-bearing surface in a depth direction is greater than a height of the oscillation layer.

4. The magnetic recording head of claim 3, wherein a film thickness of a portion of the magnetic material layer located above the air-bearing surface in a height direction is greater than a film thickness of a portion of the magnetic material layer located on the air-bearing surface.

5. The magnetic recording head of claim 2, wherein a width of the magnetic material layer in a track width direction is greater than a width of the oscillation layer in the track width direction.

6. The magnetic recording head of claim 5, wherein a film thickness of both side portions of the magnetic material layer in the track width direction is greater than a film thickness of a central portion of the magnetic material layer in the track width direction.

7. The magnetic recording head of claim 1, wherein
   a height of the magnetic material layer from the air-bearing surface in a depth direction is greater than a height of the oscillation layer, and
   a film thickness of a portion of the magnetic material layer located above the air-bearing surface in a height direction is greater than a film thickness of a portion of the magnetic material layer located on the air-bearing surface.

8. The magnetic recording head of claim 7, wherein
   a width of the magnetic material layer in a track width direction is greater than a width of the oscillation layer in the track width direction, and
   a film thickness of both side portions of the magnetic material layer in the track width direction is greater than a film thickness of a central portion of the magnetic material layer in the track width direction.

9. The magnetic recording head of claim 1, wherein
   a width of the magnetic material layer in a track width direction is greater than a width of the oscillation layer in the track width direction, and
   a film thickness of both side portions of the magnetic material layer in the track width direction is greater than a film thickness of a central portion of the magnetic material layer in the track width direction.

10. The magnetic recording head of claim 9, wherein both side portions of the magnetic material layer in the track width direction protrude toward a side of the high-frequency oscillator.

11. The magnetic recording head of claim 1, wherein
    a width of the magnetic material layer in a track width direction is greater than a width of the oscillation layer in the track width direction, and
    both side portions of the magnetic material layer in the track width direction protrude toward a side of the high-frequency oscillator.

12. The magnetic recording head of claim 1, wherein a thickness of an area of the magnetic material layer facing the high-frequency oscillator is less than a thickness of an area other than the area facing the high-frequency oscillator.

13. A disk device comprising:
    a disk recording medium comprising a magnetic recording layer; and
    the magnetic recording head of claim 1 configured to record information in the recording medium.

14. The disk device of claim 13, wherein an area of a facing surface of the magnetic material layer facing the oscillation layer is greater than an area of the stack surface of the oscillation layer.

15. The disk device of claim 13, wherein
    a height of the magnetic material layer from the air-bearing surface in a depth direction is greater than a height of the oscillation layer, and
    a film thickness of a portion of the magnetic material layer located above the air-bearing surface in a height direction is greater than a film thickness of a portion of the magnetic material layer located on the air-bearing surface.

16. The disk device of claim 13, wherein
    a width of the magnetic material layer in a track width direction is greater than a width of the oscillation layer in the track width direction, and
    a film thickness of both side portions of the magnetic material layer in the track width direction is greater than a film thickness of a central portion of the magnetic material layer in the track width direction.

17. The disk device of claim 16, wherein both side portions of the magnetic material layer in the track width direction protrude toward a side of the high-frequency oscillator.

18. The disk device of claim 13, wherein a thickness of an area of the magnetic material layer facing the high-frequency oscillator is less than a thickness of an area other than the area facing the high-frequency oscillator.

\* \* \* \* \*